United States Patent [19]

Gerber

[11] Patent Number: 4,807,218
[45] Date of Patent: Feb. 21, 1989

[54] SYSTEM FOR RECORDING DIGITAL INFORMATION USING A REGULAR ARRAY OF DISCRETE MICROMIRRORS

[76] Inventor: Arthur M. Gerber, 350 Thames Drive, Colorado Springs, Colorado 80906

[21] Appl. No.: 91,294

[22] Filed: Aug. 27, 1987

Related U.S. Application Data

[63] Continuation of Ser. No. 700,735, Feb. 11, 1985, abandoned.

[51] Int. Cl.$^4$ .......................... G11C 13/04; G11B 7/00
[52] U.S. Cl. .................................... 369/100; 369/275; 346/76 L; 365/126
[58] Field of Search .............. 369/100, 275, 284, 288; 365/126, 127; 346/77 E, 76 L, 135.1

[56] References Cited

U.S. PATENT DOCUMENTS

| | | | |
|---|---|---|---|
| 3,455,239 | 7/1969 | Smith | 346/76 |
| 4,097,895 | 6/1978 | Spong | 358/128 |
| 4,335,198 | 6/1982 | Hanada et al. | 369/275 |
| 4,362,806 | 12/1982 | Whitmore | 430/202 |
| 4,422,159 | 12/1983 | Craighead et al. | 369/275 |

OTHER PUBLICATIONS

Holmstrom et al., IBM Tech. Dis. Bull., vol. 10, No. 6, 11/1967, p. 760.
Craighead et al., Appl. Phys. Lett., vol. 39, No. 7, 10/1981, pp. 532–534.
Haller et al., IBM Tech. Dis. Bull., vol. 22, No. 3, 8/1979, p. 1234.

Primary Examiner—Alan Faber
Assistant Examiner—Hoa T. Nguyen
Attorney, Agent, or Firm—E. T. Barrett

[57] ABSTRACT

A digital recording medium formed of a thermoplastic substrate having a regular array of microscopic optically-alterable mirrors each by a mesa projecting from one surface. The parallel rows of the mirrors are the same distance apart as the mirrors in each row. A layer of transparent plastic over the mirrors provides dust protection. The medium can be formed from a single transparent thermoplastic substrate with an array of indentations in a first surface. The bottom of each indentation is coated with a reflective material. When viewed from the opposite surface of the substrate, the indentations become mesas.

Recording is by exposure to a laser beam that reduces the reflectivity of selected mirrors. After exposure to the recording laser beam, the mirrors retain enough reflectivity to be distinguishable from the intervening valleys. The mirrors serve as timing and tracking markers prior to and during recording, and during read-out. The area and location of each information bit is determined prior to recording: not as a result of the recording process. The mirrors are scanned diagonally across the rows that make up the array. Scanning is accomplished by reciprocating movement of the medium.

15 Claims, 5 Drawing Sheets

SYSTEM FOR RECORDING DIGITAL INFORMATION USING A REGULAR ARRAY OF DISCRETE MICROMIRRORS

This application is a continuation of application Ser. No. 700,735, filed 2/11/85 now abandoned.

BACKGROUND OF THE INVENTION

1. Field of the Invention

This invention relates to digital recording media and more particularly to high capacity recording media for optical recording and read-out.

2. Description of the Related Art

Digital information has been recorded on many kinds of materials by a wide variety of processes. One widely used system magnetizes selected areas of a disk of magnetic material to represent the information to be preserved. Other approcahes, used primarily when greater recording density is desired, include the use of a substrate coated with a material capable of being changed by selective treatment with a laser beam. For example, the substrate may have a reflective surface that is caused to have lower reflectivity in those areas where it is heated by a focused laser beam. Conversely, non-reflecting absorbent surfaces have been rendered reflective by the application of a lser beam as described in Optical Memory News, September–October 1984, page 14. The reflectivity of the surface may be altered by melting or deforming the surface or by actual evaporation of material from the surface. Most often, the medium is in the form of a disk and the information is recorded along a spiral track. The timing and tracking information may also be recorded by a modulated laser beam following the spiral track.

U.S. Pat. Nos. 4,214,249 to Kasai; 4,270,916 to Dil; 4,379,299 to Fitzpatrick et al.; 4,314,262 to Reilly; and 4,334,299 to Komurasaki et al. disclose media of the kinds referred to above.

The Dil Patent discloses recording on a disk having a grooved spiral and in which timing marks are recorded on the sloping walls of the grooves.

The Kasai patent discloses the recording of digital information by the selective exposure to a laser beam that causes deformation or evaporation of a layer composed of S, Se, Te, or chalcogenide compounds thereof. The rate of recording is limited by the head conductivity of the medium.

The Fitzpatrick patent describes a digital writing process in which a film of semiconductor material, such as cadmium telluride, on a substrate of plastic such as methylmethacrylate or polycarbonate, is exposed to a recording laser beam that heats the plastic substrate to produce a pressurized gas bubble that bursts the overlying semiconductor leaving a pit or hole in the reflective surface that represents one bit of information. The rate at which information can be recorded is limited by the amount of heat required to cause the eruption and the heat conductivity of the recording medium.

The Reilly patent describes a recording medium formed by a thin continuous layer of metal in which bits of data are recorded by alterations produced with focused spots of laser light. A transparent dielectric coating is provided to increase the light absorption of the metal layer.

The Komurasaki patent describes a real-time monitor for use with a recording medium comprising a continuous film of metal such as bismuth, gold or chromium which is selectively melted or vaporized by a focused light beam to record one bit of information.

U.S. Pat. No. 4,380,769 to Thomas et al. describes the recording of information by the thermal deformation of a continuous thin film of amorphous material carried by a plastic substrate. Individual depressions surrounded by sharply defined ridges are produced in the amorphous film.

U.S. Pat. No. 4,334,233 to Murakami describes a dustprotecting shield over the substrate that minimizes information distortion that might otherwise occur because of dust particles on the recording medium.

U.S. Pat. No. 4,428,075 to Hazel describes a preformatted disk in which synchronization marks are recorded in areas separate from the data recording areas. These tracking and timing marks are distinct from the alterations that represent bits of data and, to the extent they occupy space that could otherwise be used for digital storage, reduce the capacity of the disk.

The formation of arrays having microscopic relief patterns is known in the photographic field where such techniques are used to reduce variations in image density. U.S. Pat. Nos. 4,366,299 to Land and 4,402,571 to Cowan et. al. discuss the formation of spaced discrete holes using as photoresist that is exposed twice to the interference patterns of two laser beams, one exposure being below the threshold for the development of the photoresist. Land also describes for photographic purposes the formation of peaks coated with silver as one step in formation of a silver halide coating. The structure proposed by Land does not lend itself to the recording of digital information.

U.S. Pat. No. 3,019,124 to Rogers discloses a method of manufacturing photographic elements by applying a first light sensitive layer in a uniform thickness to a support, embossing the coated layer to form a relief impression having systematically arranged spaced elevated sections joined by depressed sections interspersed between them, and applying a second light sensitive layer having a different spectral sensitivity to fill the depressions remaining in the surface to the level of raised sections.

U.S. Pat. No. 4,362,806 to Whitmore describes a photographic substrate comprising an array of microvessels that are filled with various photographic materials. The object is to reduce lateral image spreading by providing a discontinuous recording substrate. The microvessels are separated only by minute distances that play no part in the recapture of information. Any appreciable thickness of the walls separating the microvessels detracts from the continuous image that is the object of the Whitmore disclosure. The recording is done over mass areas and the microvessel walls are used to prevent undesired lateral spreading of the photographic image. Whitmore suggests electronically scanning the photographic elements to read information in digital format. Whitmore also discloses modifying the microvessels by scanning with a laser beam to alter the character of selected microvessels by melting, sublimation or change in viscosity. The microvessels of Whitmore require subsequent photographic processing to provide optically readable information.

SUMMARY OF THE INVENTION

A digital recording medium has discrete spaced individually-alterable storage elements which, in one embodiment, in the unaltered state, are tiny mirror surfaces, sometimes calles here "micromirrors", arranged in a substantialy regular array in a plane spaced from a reference plane of a supporting substrate. Each micromirror is supported by a mesa extending from the substrate so that the micromirrors are separated by valleys or indentations between the mesas. Each micromirror is individually optically alterable to store one or more bits of information. The substrate may be protected from contaminates by a layer of transparent material of substantial thickness that minimizes the effect of dust particles. The array of micromirrors is arranged to be scanned by a recording device and subsequently, without further processing, by a reading device.

Information is recorded by causing a change in the reflectivity of the selected micromirrors, for example, by subjecting the surface of each selected micromirror to an infrared light beam of sufficient intensity to materially reduce the reflectivity of the mirror. Each micromirror, by having one of two or more levels of reflectivity, becomes a depository for one or more bits of digital information.

The regular spacing of the array of micromirrors enables them to serve both as tracking and timing markers prior to and during recording and read-out. In effect, the medium itself acts as an optical encoder for the scanning device. This arrangement permits variations in the scanning velocity, a particular advantage when reciprocating scanning procedures are used. The micromirrors may be used to control the scanning path, both for recording and read-out, by centering the beam along the path of maximum reflection.

The use of an array fo regularly spaced discrete reflective micromirrors makes it possible to test the recording medium for defects prior to recording and authenticate its quality. In a practical way, this eliminates the need for monitoring the recording process because the chance of failing to record on a mesa having the required level of reflectivity is small. The reduction in reflectivity of exposed micromirrors results from the absorption of sufficient energy to change the mirror coating itself or to distort the thermoplastic mesa supporting the mirror. The reflectivity of the recorded micromirrors preferably is not reduced to zero, but rather only enough that it can be readily distinguished as a recorded micromirror, the reflectivity of the recorded micromirror remaining greater than that of the valleys separating the micromirrors.

In another embodiment, the micromirrors are formed on the bottom surfaces of spaced indentations in a first surface of a sheet of clear substrate. Viewed from the second surface of the substrate, the indentations become mesas supporting the micromirrors. The recording and reading light beams are focused on the micromirrors through the second surface of the substrate.

In a preferred embodiment, the recorded medium is moved linearly along a full row of micromirros, while a small transverse oscillation of the read-out light beam maintains the lateral position of the recorded medium such that the read-out beam on the average, tracks the approximate center of the row of mirrors being scanned. At the end of each linear scan, from end to end of the row of micromirrors, the recorded medium is moved laterally one row and then moved linearly in the opposite direction. The arrangement of the micromirrors permits a wide choice in the selection of a particular read-out procedure.

DESCRIPTION OF THE PREFERRED EMBODIMENTS

The drawings are not to scale and various elements have been exaggerated for purposes of illustration. In the various figures, similar elements are indicated by the same numerals or by the same numerals followed by an identifying letter suffix.

Figure 1:
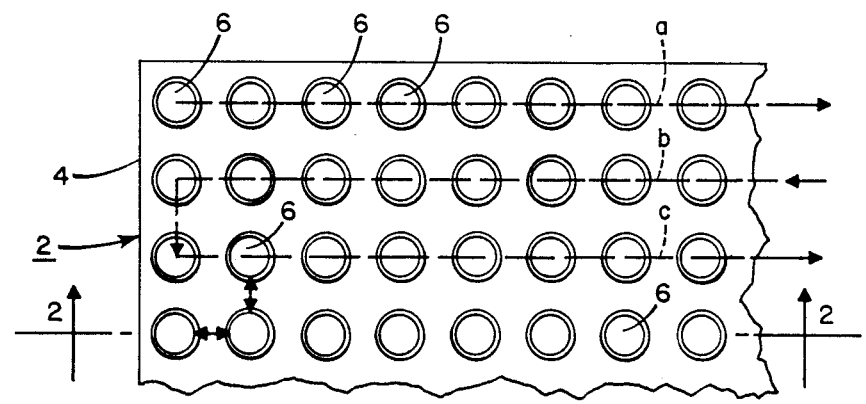
FIG. 1 is an enlarged diagrammatic top view of a small section of a recording medium embodying the invention.
Figure 2:
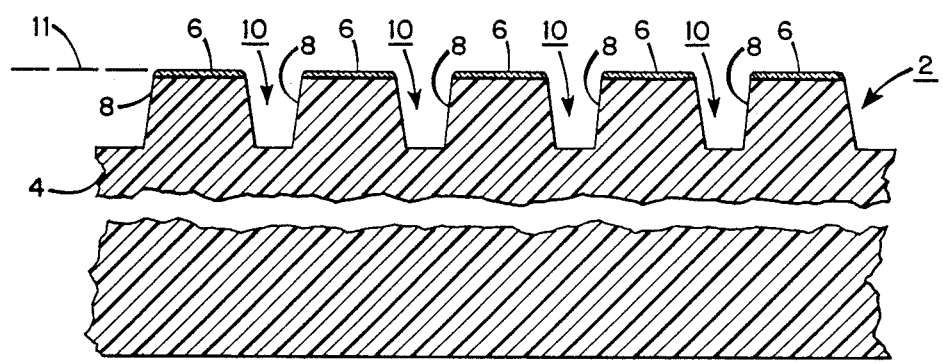
FIG. 2 is a sectional view along line 2—2 of Figure 1.
Figure 3:
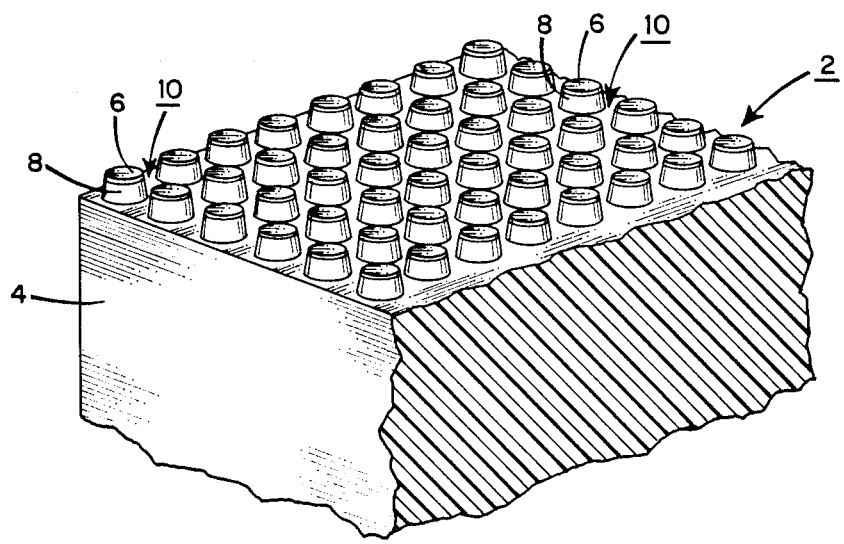
FIG. 3 is a partial perspective view of the recording medium shown in FIGS. 1 and 2.

As illustrated by FIGS. 1-3, a recording medium, generally indicated at 2, in this example, is in the form of a rectangular plastic card about 2 by 3.5 inches which is capable of recording more than 800 megabits of digital information. The medium comprises a substrate or base element 4 having an array of uniformly spaced micromirrors 6, each supported by a minute projection or mesa 8 extending from one surface of the substrate 4. The projections 8 are integrally formed as part of the substrate 4, which may be formed of thermoplastic material, and are separated by valleys, generally indicated at 10.

The projections or mesas 8 which support the micromirrors 6 serve two functions: to provide thermal isolation between adjacent mirrors and to provide a light sink between the mirrors in the form of the valleys 10. The height of the projections 8 above the substrate 4 is not critical and is typically between 0.5 and 2.5 micrometers. The projections 8, in this example, are arranged in the array to provide one storage element for each two micrometers along each row of mirrors.

The thickness of the substrate 4 is not critical but may be of the order of 100 or more times the height of the mesas 8. The mirrors 6, which lie in a common plane, are of material capable of reflecting laser light. Each micromirror is of sufficient size and flatness to function as an effective mirror at the frequency of light being used to read the data from the medium. The mirrors may be formed by coating the tops of each mesa 8 with a layer of reflective material capable of absorbing sufficient energy to permit a low power laser beam to reduce significantly the reflectivity of the micromirror with an exposure of less than about one microsecond. The preferred mirror coating is a composite formed of gold and silicon dioxide. The mirrors 6 should be as flat as possible and the surface variations should be limited to a fraction of a wavelength of the incident light, for example, from one-fifth to one-tenth of a wavelength. For the present purposes, a mirror capable of reflecting 20-25% or more of the incident light to be used for readout is defined as a "flat mirror". Each micromirror is capable of immediately detectable alteration, for example, by exposure to a source of focused energy, such as a laser beam, by which is meant the alteration takes place substantially immediately upon such exposure and may be detected without further processing such as is required in photographic and other indirect processes.

Preferably, the micromirrors 6 form a regular array as illustrated by FIG. 1. By a regular array is meant an array in which the storage elements are equally spaced in parallel rows that are separated by a distance equal to the distance between adjacent storage elements in the rows. With this arrangement, the medium can be tested for defects prior to recording by scanning the surface of the medium with a non-destructive laser beam and measuring the reflectivity from each micromirror. The reflective and absorptive capacity of the micromirror is a function of the amount of coated material on the mesa, therefore, if each micromirror is confirmed for reflectivity, the medium can be certified for recording with a high degree of assurance that the recording will be accurate. During this pre-test, the physical position, as well as the reflectivity, of each micromirror is verified. This may be done by any desired mode of scanning in which the distance between micromirrors is verified, as by a counting device related to the speed of the beam scan.

Each micromirror 6 represents one bit of information. Note that the size of each bit of information is determined prior to recording: it is not the recording device that determines either the position or size of the information bits. With this arrangement, the micromirrors 6 themselves provide the tracking guides for pre-testing, recording, and read-out. The data can be packed with maximum density because no allowance is required for variations in laser spot size during recording. The tolerances permitted in the area of the focus of the laser beam at the plane of the mirrors are thus greater than in those arrangements where the position and size of each recorded bit is determined by the action of the laser beam. The maximum surface dimension of each micromirror is preferably between 1 and 2.5 micrometers and the minimum dimension should not be less than the wavelength of the light being used for reading. For special applications, the mirror size may be less than one micrometer or substantially greater than 2.5 micrometers. For most applications, where density of recording is important, the area of the micromirror preferably is between 0.7 and about 5 square micrometers. It is preferred that the distance between the mesas 6 be not significantly less than the maximum surface dimension of the micromirrors. The reflecting area of the micromirrors 6 may be round, square, rectangular or any other desired shape. It is convenient, however, to provide a regular array of generally round reflecting surfaces equally spaced in parallel rows, such as result from the example set forth below. Each micromirror preferably has an original reflectivity of at least 20% of the particular laser light being used. After exposure to the laser beam to destroy the reflectivity, the reflection preferably is significantly less than 20% or at least significantly less than the reflectivity of the orignial mirror surface.

In one system, preferred for many typical applications, the round micromirrors of one micrometer diameter are spaced one micrometer apart and a recording laser beam is arranged to scan the mirrors at a speed of about two meters per second to record data at a one megabit/second rate. If a higher data rate is desired, a faster scanning speed can be used. The micromirrors preferably are spaced as closely as possible in the array, for maximum storage capacity, but the dimensions of each mirror must be large enough to permit it to function as a mirror at the wavelength of light being used and the micromirrors must be separated by a distance great enough that neither the recording or read-out laser beam can overlap two micromirrors.

EXAMPLE

The following is an example of the steps in the preparation of the recording medium embodying the present invention: A photoresist relief pattern comprising a square array of flat bottoms with tapered peaks, with center-to-center spacing of about 2 micrometers (see FIGS. 4, 5 and 6) was prepared as follows. Positive photoresist (Shipley AZ-1450J, manufactured by Shipley Company, Inc. Newton, Mass. was spin coated on a glass plate to a thickness of several micrometers. The plate was then exposed to an argon laser interference pattern using a glass prism to split the beam and to recombine the two halves, thus forming a series of spaced parallel interference lines at the photoresist target. The exposure was through the glass plate so the greatest exposure was at the bottom of the layer of the photoresist.

Figure 4:
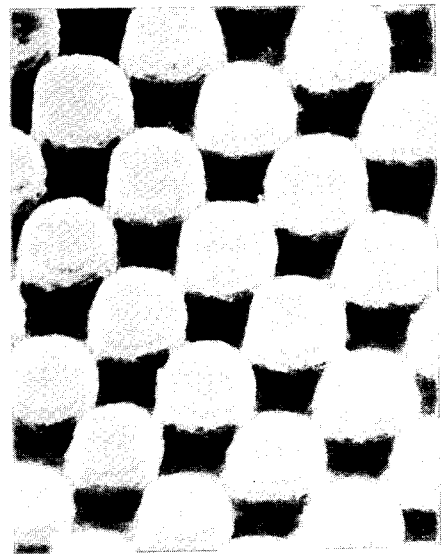
FIG. 4 is a reproduction of a scanning electron micrograph of the recording medium of FIGS. 1-3 at a magnification of 10,000X.

After a three-minute exposure, the plate was rotated 90 degrees and exposed a second time, as described by M. T. Gale in Optics Communications, Volume 18, No. 3, August 1976, page 295. The plate was then developed for twenty seconds in Shipley developer. FIG. 4 is a reproduction of a scanning electron micrograph, at a magnification of 10,000X, of the photoresist pattern, tilted at an angle of about 45°. This micrograph shows partly etched saddle points between adjacent peaks, indicating that each exposure was above the threshold for development of the photoresist. It shows also that at the intersection of the lines, etching of the photoresist extends to the surface of the glass plate. The flat surfaces thus created are important because they will define the flat substrate of the reflective micromirrors of the optical recording medium.

A nickel mold was made from the photoresist plate, prepared as above. This process is described in National Geographic, March 1984, page 373. A second generation nickel electroform was made from the original nickel master. The second generation nickel had contours corresponding to those of the photoresist plate and served as a stamper to reproduce the pattern by embossing sheets of plastic.

Figure 5:
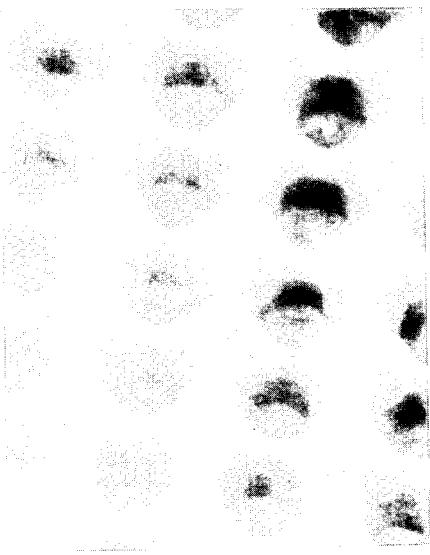
FIG. 5 is a reproduction of a scanning electron micrograph of an embossed layer of PVC for use in fabricating the recording medium.

An array of flat-topped plastic mesas was produced by embossing a sheet of PVC plastic with the nickel stamper, described above, in a Carver Laboratory press, Model C. manufactured by Fred C. Carver, Inc., Menomonee Falls, Wis. The nickel stamper was placed, contoured side up, on a sheet of lead on the lower stage of the press. A sheet of 10 mil thick glossy black PVC plastic, obtained from Ridout Plastics, San Diego, Calif., was placed over the nickel stamper. The press was pumped to a pressure of 20,000 pounds and the lower heating unit was raised to a temperature of 250 degrees Fahrenheit. The heater in the upper platen was not energized while the heat from the lower unit penetrated the lead, nickel and plastic. When the thermometer in the upper platen read 200° F., the lower heater was turned off and the 20,000 pounds pressure was maintained during cooling. When the temperature in the upper unit had dropped to 150° F., the pressure was released and the PVC was peeled from the niclel stamper. A bright diffraction pattern was visible on the embossed PVC. FIG. 5 is a reproduction of a scanning electron micrograph of the embossed PVC at a magnification of 10,000X tilted at an angle of about 45°.

A reflective material was then coated on the embossed surface of the PVC. This material was chosen to be both reflective enough to permit identification as a micromirror by an optical reading device and also capable of absorbing sufficient laser energy to melt or cause distortion of the plastic substrate during data recording. The preferred material is a metal and ceramic composite of gold and silicon dioxide. Such materials, known as cermets, have been used for thin film resistors and in light absorbing applications such as solar collectors. The Au-SiO$_2$ system is described in the Handbook of Thin Film Technology, McGraw-Hill, 1983, chapter 18, page 21.

The cermet layer, coated on glossy clear polyester, has about four times greater absorbancy at 830 nm than a pure gold layer on the same substrate. The cermet is also significantly more sensitive to alteration of reflectivity by laser light. A pure gold layer showed no resonse to pulses of several microseconds, at a power level of about 5 milliwatts. Under the same conditions, the cermet coating showed significant changes in reflectivity in response to pulses of less than one microsecond.

Finally, cermet was sputter coated on the embossed PVC described earlier. This storage medium showed visible changes in reflectivity at pulse durations of less than 0.3 microseconds at the same 5 milliwatt power level.

Figure 6:
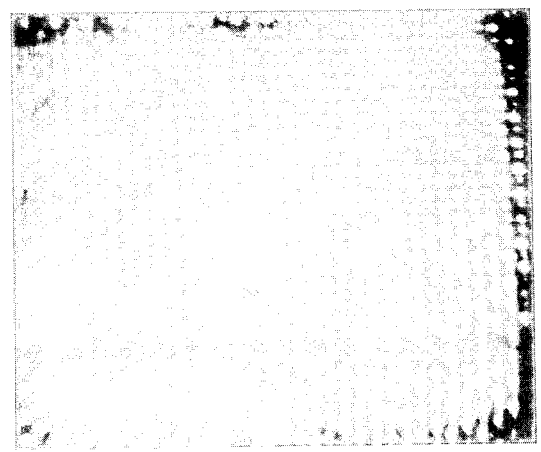
FIG. 6 is a reproduction of a photograph of a video image of the medium taken from a video screen at a magnification of 1,750X.

FIG. 6 is a reproduction of a photograph of a sample of the recording medium comprising an array of individually alterable micromirrors of Au-SiO$_2$ on embossed PVC plastic. The photograph was from a TV monitor attached to an optical system providing a magnification of about 1750X on the screen. Some of the micromirrors in a row near the bottom have been exposed to a 0.5 microsecond pulse from an 830 nm diode laser, at a power level of about 5 milliwatts. The darkened spots are clearly visible as areas of significantly lower reflectivity in response to the laser pulses.

In this test, the response to the recording laser beam was only along the rows of micromirrors, not between them. If only a portion of a micromirror is exposed to the laser beam, the entire micromirror will still melt or be distorted, although somewhat more slowly. These properties are especially advantageous in optical data recording because the recorded spot size and location is less sensitive to variations in the laser spot size and alignment.

In reading a previously recorded area of the medium, it is desirable to be able to distinguish between three levels of illumination: the level represented by an untreated micromirror retaining its original reflectivity, the level represented by a micromirror that has been treated by the laser beam to destroy its reflectivity, and the reflectivity represented by the valleys 10 between the mesas 8. The areas between the mesas have no reflecting surface in the plane of the micromirrors 6, so that the reflection is reduced by dispersion of the beam at positions beyond the focal point of the beam. The untreated areas of the medium 2 between the mesas will also have an inherently lower reflectivity than the micromirrors 6 even though some of the sputtered mirror coating material is deposited in the valley areas. Generally, therefore, it is not desirable to eliminate all reflectivity of the micromirrors 6, but to reduce it only enough to make it readily distinguishable from the untreated micromirrors. This allows recorded micromirrors to continue to serve as tracking and timing markers. In this example, the unaltered micromirrors have a reflectivity greater than 20% at 830 nm and a laser power of about 3.2 nanojoules per square micrometer is sufficient to reduce the reflectivity of the mirror coating by the desired amount. Other kinds or quantities of mirror coatings can be used that require higher recording energy, but it is preferable that the micromirror be destroyed by exposure to focused energy no greater than 200 nanojoules per square micrometer.

Figure 7:
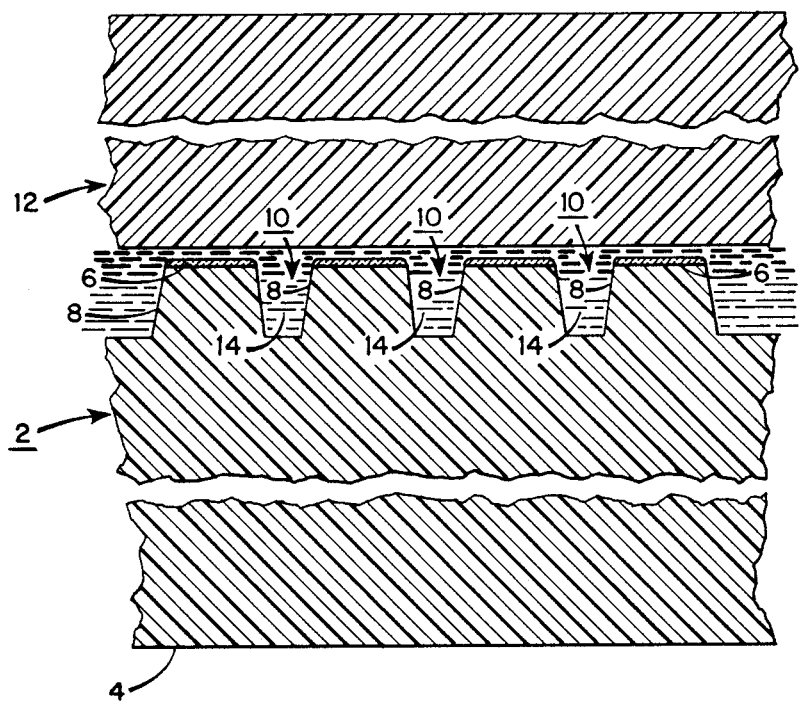
FIG. 7 shows a section of the medium of FIGS. 1-3 including a transparent protective shield and in which a filler is placed in the valleys between the mirrors.

It is important to provide a mirror surface that is relatively immune to oxidation or discoloration or dulling from other causes. It is important also, to provide a surface that is affected only minimally by dust or other contaminates. For those reasons, a layer of transparent material, generally indicated at 12 in FIG. 7, is positioned over the surface of the mesas 8. This layer, which may be formed of polyester, polycarbonate or other transparent plastic, is in contact with the micromirrors 6 and is of substantial thickness (100 or more times the height of the mesas 6) so that, during recording and read-out by a laser beam focused on the micromirrors 6, the converging laser beam covers a significant area at the point where it enters the layer 12 and so minimizes the effect of a dust particle on the surface of the layer 12.

A filler 14, which may be a liquid such as oil, fills the valleys 10 and displaces any air that would otherwise be trapped between the micromirror surfaces and the layer 12. The liquid is preferably selected with an index of refraction near that of the plastic from which the layer 12 is formed to avoid any undesirable reflection of the laser beam. The filler 14 may remain as a liquid or it may be composed of a liquid plastic accompanied by a catalyst so that after the filler is in position the plastic solidifies. Alternatively the filler may be a UV curable polymer. With any of the filler compositions, it is desirable to add an infrared absorbing dye to the filler to further reduce any reflection from the valleys 10. Such dyes are well known in the prior art.

In general, the recording of data by altering the reflectivity of selected micromirrors results in each micromirror having only one of two possible states, that is, the micromirror reflects the incident light as a mirror or has a reflectivity below some predetermined level and is not considered to be a mirror. The density of information storage can be increased by providing for additional levels of reflectivity. For example, each original micromirror 6 can be constructed to have a reflectivity of 40–45% at the frequency of the laser beam used for read-out. A first level of intensity of the laser recording beam may be adjusted so that during the time of recording on one micromirror, the reflectivity is reduced to between 25% and 35%. To record another state, the intensity of the recording laser beam is increased sufficiently that during the time of exposure the reflectivity is reduced to between 10% and 20%. A single micromirror can thus be used to store any one of three information indicia (1) the mirror retains full reflectivity, that is, between 45% and 55%; (2) the reflectivity is between 25% and 35%; and (3) the reflectivity is between 10% and 20%. The valleys 10 should have a reflectivity substantially less than 10% to permit even the micromirrors with minimum reflectivity to be used as timing and tracking guides.

Figure 8:
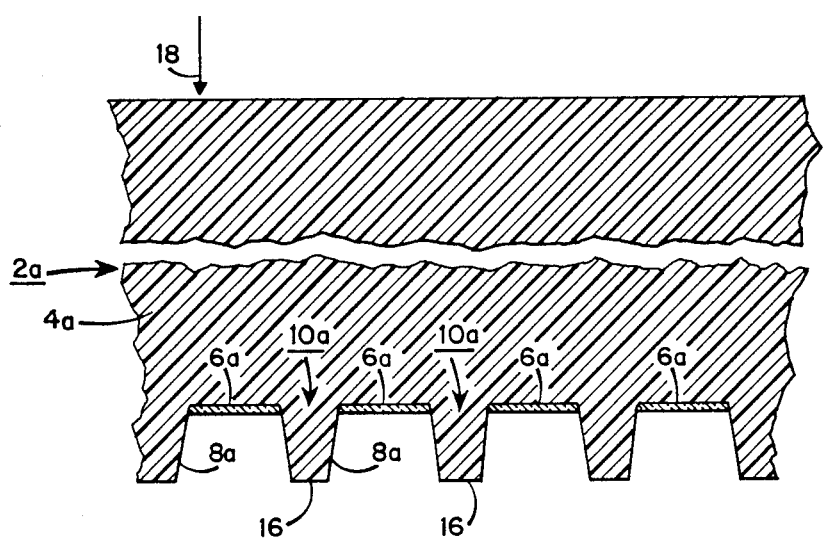
FIG. 8 is a partial sectional view of another embodiment of the recording medium in which the protective shield and the substrate are formed integrally from a single sheet of plastic.

In an alternative embodiment, the recording medium and the overlying plastic protective sheet are fabricated as an integral structure. As illustrated by FIG. 8, the stamper used to form the medium 2a is the reverse of the one used to form the medium of FIGS. 1–3. In this instance, the mesas 8a are formed as depressions in a first surface 16 of a substrate 4a formed of clear thermoplastic. The micromirrors 6a are formed by exposing the surface containing the indentations to the sputtering action of the mirror coating. The micromirrors 6a are therefore formed on the flat surfaces at the bottoms of the indentations. However, viewed from the opposite side, in the direction of the arrow 18, the indentations appear as mesas with the mirror coating on the flat tops.

The micromirrors 6a are exposed to the recording and reading laser beams, in the direction of the arrow 18, through the plastic substrate 4a. With this arrangement, the micromirrors 6a are in intimate contact with substrate material providing superior protection of the reflecting surfaces from contamination. One additional advantage of this construction is that, in the process of fabrication, reflective material that is inevitably sputtered onto the exposed surface 16 of the substrate 4a, which forms the bottoms of the valleys 10a, may be completely removed by abrading. The bottom surface of the substrate 4a between the indentations may be provided with a layer of light absorbent material thereby rendering the valleys 10a between the micromirrors substantially non-reflective. The plastic material of the substrate 4a now replaces the layer 12 that is a separate entity in the earlier embodiment. The plastic is continuous from the surface exposed to the laser beam to the bottom of the valleys 10a at the surface 16 with no disruptive reflections resulting from a change in the index of refraction.

Figure 9:
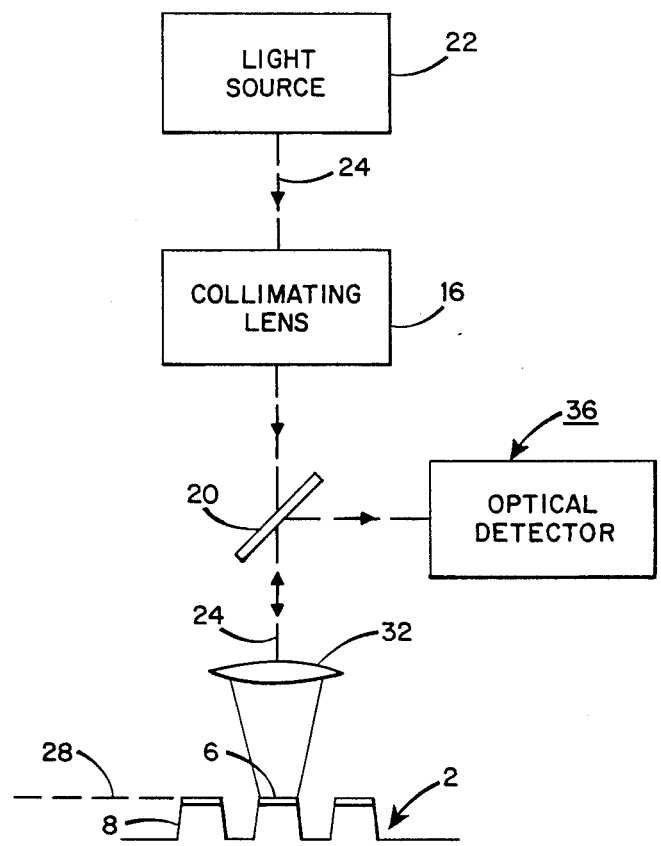
FIG. 9 shows diagrammatically a source of laser light and the associated optics and detectors for recording on and reading from the medium.

One scanning procedure for recording on and reading from either of the embodiments of the medium 2 and 2a is illustrated by FIGS. 1 and 9. A source of coherent light, such as a diode laser 22, produces a beam 24, that is first made more uniform by a collimating lens and an anamorphic prism, both indicated diagrammatically at 16, and then is focused through an objective lens 32 onto the micromirrors 6. The maximum dimension of the beam of the plane of the mirrors, indicated by the broken line 28, is preferably no greater than the cross-sectional area of each individual mirror, and in any event small enough to distinguish one micromirror from any adjacent micromirror. The same optical system is used for both recording and reading. The laser light reflected from the micromirrors is directed by a beam splitter 20 to an optical detector, generally indicated at 36.

Figure 10:
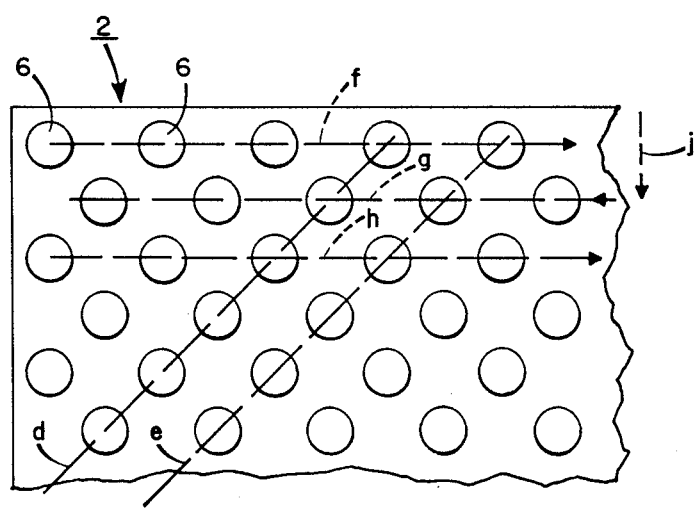
FIG. 10 illustrates diagrammatically a preferred scanning sequence for both recording and read-out.

One method for scanning the medium 2 is to cause the laser beam to traverse one row of micromirrors from one end of the medium 2 to the other. At the end of each row, the laser beam is caused to move to the next row of micromirrors and to scan that row in the opposite direction. As illustrated in FIG. 1, a first row of micromirrors is scanned along line "a" from one end of the medium to the other. The scanning beam is then moved sideways to the next row and scans along line "b" in the reverse direction. The beam is then again moved sideways and the micromirrors scanned along line "c". A preferred procedure, however, is to scan the micromirrors diagonally as illustrated by FIG. 10 which provides an improved signal to noise ratio by increasing the distance between successive micromirrors. The equally spaced rows of micromirrors that make up the regular array are represented by the broken lines "d" and "e". The scanning track of the laser beam 24, however, is successively along lines "f", "g" and "h" which are diagonal with respect to the parallel rows of micromirros, such as "d" and "e", forming the regular array. At the end of row "f", the scanning motion is interrupted and moved sideways in the direction of the arrow "j" to place the row "g" in scanning position. The laser beam then scans that row in the reverse direction along the line "g". This process is repeated to scan the entire series of rows over the entire surface of the medium. An end-of-row code is pre-recorded on each row and is read by the recording and reading systems to cause the scan to move to the next row of micromirrors at the appropriate point.

The scanning movement along the rows may be accomplished by moving either the entire laser and optics assembly or by moving the medium 2. In this example, because the mass of the medium 2 is only a fraction of that of the laser-optics assembly, there is substantial advantage in moving the medium. The reciprocating scanning action, which results in variations in the scanning velocity, is made practical by the regular arrangement of the micromirrors which can be used to control the timing both during recording and read-out.

The transverse movement, to move the beam from one row of micromirrors to the next, is preferably accomplished by a sideways movement of the laser 22 and the associated optics at the end of the scanning of each row of micromirrors. The sideways movement may also be accomplished by movement of the medium, by deflection of the laser beam, or by a combination of the two. For example, the laser beam may be deflected, by means well known in the art, to accommodate the scanning of a preselected number of rows and then the medium moved sideways by a similar number of rows while the beam deflection is returned to its original position.

Figure 11:
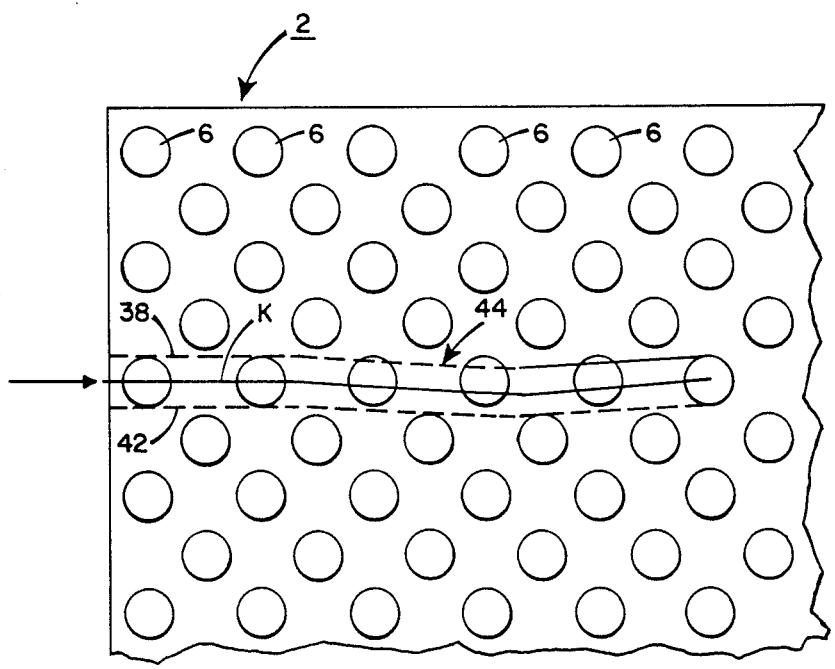
FIG. 11 illustrates the use of the micromirrors for tracking during recording and read-out.

During the scanning, the position of either the laser beam or the medium 2, or both, are controlled by the use of the micromirrors as tracking guides. During the scanning of each row of micromirrors, the beam 14 is caused to oscillate transversely, at a frequency much lower than the data rate, by a galvanometer-actuated mirror, or other means well known in the art, for a distance at the point of focus somewhat less than the distance across one micromirror. The transverse sweep of the scanning action is indicated by the broken lines 38 and 42 in FIG. 11 as the scan proceeds along the centerline "k". The magnitude of the transverse scan depends upon the size of the micromirrors, the size of the scanning spot, and the distance between adjacent micromirrors. The intensity of the reflected light is averaged by a tracking control mechanism, which forms part of the optical detector 36, over a substantial number of micromirrors before changing the direction of oscillation, in order to improve the tracking precision. The tracking control mechanism maintains the beam 24 centered on the row of micromirrors being scanned. If the average intensity of the reflected beam when it is deflected, say, to the right, as diagrammatically illustrated at 44, is less than the average intensity when deflected an equal distance in the opposite direction, the beam 24 is adjusted toward the left to move it nearer the center line of the micromirrors. If desired, the area of the beam 24 in the focus plane may be made slightly larger than the reflecting area of one micromirror, so long as it is small enough that it cannot encompass any substantial fraction of two mirrors at the same time, so that it can detect the reflectivity of each micromirror despite small misalignment of the read-out beam relative to the centerline of the row of micromirrors being scanned.

Prior to recording, the medium 2 is scanned by the laser beam 24 at low intensity to determine whether all or substantially all of the micromirrors have requisite reflectivity. After the medium has been certified as free from defects, or the defects "fenced off" as described below, the permanent recording is made by the laser beam 24 which has a first level of intensity sufficient to enable the optical detector 36 to determine the presence of a reflecting micromirror 6 on the surface of a mesa 8, and a second level of intensity great enough to destroy the reflectivity of the micromirror at which it is directed. The intensity of the laser beam 24 is modulated as the recording is made to destroy the reflectivity of the mirrors in accordance with the information to be recorded.

The laser beam 24 operates at its low or reading intensity until the detector 36 indicates the beam is focused on a micromirror. If the digital information to be recorded indicates that particular micromirror is to be destroyed, the laser beam is pulsed to its higher recording intensity for a period of one microsecond or less, but long enough to destroy the micromirror. If that particular micromirror is not to be destroyed, the laser beam passes over it at the lower non-destructive intensity leaving the reflectivity of the micromirror unchanged.

By destruction of the reflectivity is meant a lowering of the reflectivity by an amount sufficient that the optical detector 36 can determine the difference between a micromirror that has been exposed to the laser beam 24 at recording intensity from one that retains its original reflectivity.

If the examination of the medium prior to recording indicates relatively few defects, the rows of micromirrors containing defects can be "fenced off", that is, the particular rows containing defects are marked with a special code that causes the scanning mechanisms used in both recording and reading to jump immediately to the succeeding row and omit scanning the defective areas of the medium. so long as the number of defects is limited, the loss in recording capacity is not significant. In addition, error-correcting codes which, in effect, record data in a redundant manner in different areas can be used to overcome defects in the recording medium.

In the examples detailed here, the medium is in the form of a small rectangular card, no more than 10-15 mils thick, well suited for reciprocal scanning modes. However, the recording array may be in the form of a drum, disk or tape and the scanning mode may be either reciprocating or continuous. The recording medium may be formed as a flat medium and then secured to a rotatable drum, or otherwise altered in shape, for recording and read-out. The reference plane of the medium, that is, one of the exposed surfaces, is considered to be parallel with the plane of the micromirrors even though both surfaces may be curved so long as the two planes are the same distance apart at all points.

What is claimed is:

1. A system for recording digital information comprising
    a laser beam source,
    a recording medium having
        a substrate, and
        an array of equally spaced, discrete, immediately detectable alterable micromirrors arranged in equally spaced parallel rows, each of said micromirrors having in its unaltered state a reflectivity of at least twenty percent of the laser beam produced by said source, and being capable of recording at least one bit of digital information,
    said laser beam source being capable of sufficient intensity to immediately reduce the reflectivity of a micromirror of said medium exposed to said beam,
    scanning means arranged to focus said laser beam successively on and identify individual micromirrors of said medium, and
    modulation means arranged to modulate said beam in accordance with the digital information to be recorded.

2. The system as claimed in claim 1 wherein said scanning means is arranged to focus said beam successively on the individual micromirrors, and
    said modulation means is arranged to change the intensity of said beam between two levels of intensity in accordance with the information to be recorded, one of said levels being of sufficient intensity to produce an immediately detectable reduction in the reflectivity of one of said micromirrors as a result of exposure to said scanning beam, and the other of said levels being of an intensity that causes no significant reduction in the refelectivity of a micromirror as a result of exposure to said laser beam during scanning.

3. The system as claimed in claim 1 wherein said laser beam source is a diode laser.

4. The system as claimed in claim 1 wherein
each of said micromirrors is flat.

5. the system as claimed in claim 1 wherein
each of said micromirrors is supported by thermoplastic material and in which
said reduction in reflectivity is the result of heat deformation of siad thermoplastic material.

6. The system as claimed in claim 5 including
a plurality of spaced, discrete projections extending from one surface of said thermoplastic material and each supporting one of said micromirrors.

7. The system as claimed in claim 5 wherein
each of said micromirors has a maximum surface dimension between about one and 2.5 micrometers.

8. The system as claimed in claim 5 wherein
each of said micromirrors comprises a metal-containing film.

9. The system as claimed in claim 6 wherein
said medium comprises
a sheet of plastic having formed integrally therewith an array of parallel rows of discrete mesas equally spaced in said rows and each supporting one of said micromirrors, each of said micromirrors being capable of being destroyed by a single pulse of focused energy less than 200 nanojoules per square micrometer thereby to form a depository for one bit of digital information.

10. The system as claimed in claim 6 wherein in the unaltered state each of said micromirrors has a reflectivity between 20 and 55 percent, and in an altered state has a reflectivity substantially less than in the unaltered state, the number and location of said micromirrors having a reduced reflectivity that is a function of the digital information recorded on said medium.

11. The system as claimed in claim 5 wherein said scanning means is arranged to scan said rows along parallel paths diagonal to said rows.

12. A system as claimed in claim 11 wherein said scanning means is arranged to scan along said paths successively in opposite directions.

13. The system as claimed in claim 11 wherein each of said micromirrors is a metal-containing film having a reflectivity of at least 20 percent and a maximum surface dimension between about one and 2.5 micrometers.

14. The system as claimed in claim 13 wherein said substrate has a reference surface and an array of parallel rows of mesas equally spaced within said rows extending from said surface, each supporting one of said micromirrors.

15. The system as claimed in claim 14 including a transparent layer overlying said micromirrors.

* * * * *